US009789675B1

(12) United States Patent
Shi

(10) Patent No.: US 9,789,675 B1
(45) Date of Patent: Oct. 17, 2017

(54) METHOD, APPARATUS AND SYSTEM FOR PROVIDING A UNIFORM LAMINATE STRUCTURE

(71) Applicant: Google Inc., Mountain View, CA (US)

(72) Inventor: Hongqin Shi, San Jose, CA (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 13/950,059

(22) Filed: Jul. 24, 2013

(51) Int. Cl.
*B32B 41/00* (2006.01)
*B32B 37/12* (2006.01)

(52) U.S. Cl.
CPC ................................ *B32B 37/1284* (2013.01)

(58) Field of Classification Search
CPC ..... H01L 2224/271; H01L 2224/83856; H01L 2224/83862; H01L 2224/85001; Y10T 156/10; Y10T 156/17; B29C 2035/0827; B29C 2035/0833; B29C 65/4835; B29C 73/12
USPC .... 156/60, 64, 291, 350, 359, 367, 378, 379
See application file for complete search history.

(56) References Cited

U.S. PATENT DOCUMENTS

| | | | | |
|---|---|---|---|---|
| 5,545,281 | A * | 8/1996 | Matsui et al. | 156/273.7 |
| 6,290,589 | B1 * | 9/2001 | Tolles | B24B 37/22<br>451/526 |
| 6,530,412 | B1 * | 3/2003 | Cronin | C09J 5/00<br>156/378 |
| 8,263,975 | B2 | 9/2012 | Kobayashi et al. | |
| 2012/0034426 | A1 | 2/2012 | Webb et al. | |
| 2012/0176693 | A1 | 7/2012 | Fitch | |
| 2012/0325402 | A1 | 12/2012 | Suwa et al. | |

FOREIGN PATENT DOCUMENTS

| | | |
|---|---|---|
| WO | WO-2005030666 | 4/2005 |
| WO | WO-2013077812 | 5/2013 |

* cited by examiner

*Primary Examiner* — Michael N Orlando
*Assistant Examiner* — Joshel Rivera

(57) ABSTRACT

Techniques and mechanisms for generating a laminate structure. In an embodiment, a layer of adhesive material is disposed on a surface of a glass plate or other constituent layer for a laminate. Prior to an application of another constituent layer, the adhesive layer is selectively cured to form in the adhesive layer at least a first portion which adjoins a second portion of the layer of adhesive material. In some embodiments, a level of cure of the first portion is greater than a level of cure of the second portion.

19 Claims, 4 Drawing Sheets

METHOD, APPARATUS AND SYSTEM FOR PROVIDING A UNIFORM LAMINATE STRUCTURE

BACKGROUND

1. Technical Field

This specification relates to the fabrication of a laminate and more particularly, although not exclusively to the preparation of an adhesive layer with uniform thickness for laminating plates.

2. Background Art

Lamination by adhesive is commonly used for making devices including those for optics, integrated circuitry or any of a wide variety of other applications. Typically, such lamination includes disposing a layer of liquid adhesive onto one laminate layer, subsequently joining another laminate layer onto the disposed liquid adhesive, applying pressure on the joined layers, and curing the adhesive between the laminate layers. With low viscosity adhesives, such as those used for thin film applications, the thickness of the disposed liquid adhesive film can be easily changed during the lamination process. For example, in glass-to-glass lamination, a composite layer of glass may experience sag and/or a non-uniform application of pressure with another composite layer of glass.

To provide for some consistency in the thickness of an adhesive layer, conventional lamination techniques variously fabricate, position, or otherwise include spacer structures in the same layer as the adhesive material. For example, in LCD sealing adhesive lines, glass or plastic beads are commonly used to control the adhesive thickness. However, the inclusion of such spacer structures within an adhesive layer has associated costs or other inefficiencies. Moreover, such spacer structures may have undesirable characteristics in optical applications, where an index of refraction of a spacer structure is different than the index of refraction of the adhesive material and/or the index of refraction of an adjoining laminate layer.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide for the formation of a laminate structure using a partially cured adhesive layer. As used herein, "laminate structure" refers to an assembly of elements which form, or which are to form, at least part of a laminate. In an embodiment, formation of such a laminate structure may include disposing a layer of adhesive material on a constituent layer (for brevity, also referred to herein as a plate) which is to be adhered to another constituent layer to form at least part of the laminate. The adhesive layer may include a first portion and a second portion, where—prior to adhesion to the other constituent layer—the first portion is brought to a first level of cure which is different than a concurrent level of cure of the second portion.

By way of illustration and not limitation, after the layer of adhesive material is disposed, the first portion may be exposed to visible light, ultraviolet (UV) light, infrared light or any of various other types of light, where a level of exposure of the first portion is different than that for any corresponding exposure of the second portion. Such exposure may cause the first portion of the adhesive layer to partially or even completely cure, where any concurrent cure of the second portion is at least temporarily less than that of the first portion. The different levels of cure may reduce viscosity of the adhesive layer overall, while allowing at least the relatively less cured second portion of the adhesive layer to provide a high level of adhesion for later lamination processing. In an embodiment, the adhesive layer includes both the at least partially cured first portion and the relatively less cured (e.g. uncured) second portion when the adhesive layer is subsequently adhered to the other constituent layer.

Figure 1:
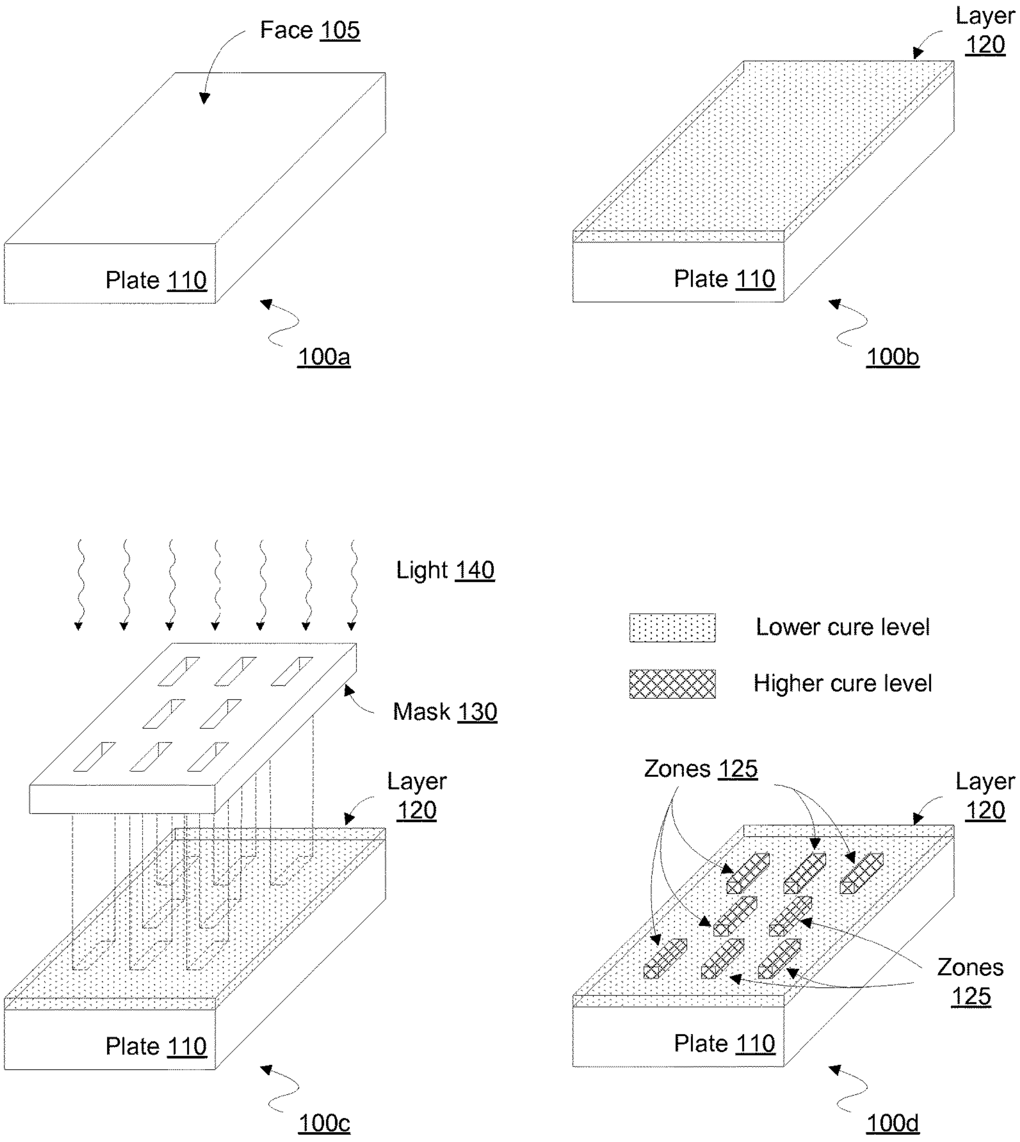
FIG. 1 is a block diagram illustrating elements of a process for fabricating a laminate structure according to an embodiment.

FIG. 1 illustrates elements of a fabrication process for generating a laminate structure according to an embodiment. Although certain embodiments are not limited in this regard, the process represented in FIG. 1 may be performed for generating any of a variety of transparent laminates such as those for use in near-eye displays or other optical devices, photovoltaic materials, touch screens and/or the like. Alternatively or in addition, such a process represented in FIG. 1 may generate a laminate for integrated circuitry, reflective tape or signage, holograms, electronic paper, medical or pharmaceutical instruments and/or other devices for any of a wide variety of applications.

To illustrate features of certain embodiments, various lamination processes are described herein with respect to the fabrication of a glass-to-glass laminate. However, such discussion may be extended to additionally or alternatively apply to the fabrication of any of a variety of other types of laminates, according to different embodiments. Certain embodiments are not limited with respect to the particular application for which a laminate may be put to use.

FIG. 1 shows features of various stages 100*a*, 100*b*, 100*c*, 100*d* of a lamination process. At stage 100*a*, a plate 110 is made available for lamination with another plate (not shown). Plate 110 may include any of a variety of materials—e.g. depending on the type of application for which the laminate is intended. By way of illustration and not limitation, plate 110 may comprise glass, optical crystals (e.g. sapphire), plastic (e.g. acrylic), a semiconductor substrate and/or any of a variety of other bulk materials. Plate 110 may be at least partially transparent with respect to some wavelength or range of wavelengths of light. For example, plate 110 may be at least partially transparent to visible light and/or UV light—e.g. where the plate is comprised of one of various glass or clear plastic materials.

In an embodiment, plate 110 itself comprises bulk materials which are laminated, grown or otherwise disposed in respective constituent layers (not shown) with respect to one another. For example, plate 100 may itself be a laminate which is fabricated according to techniques such as those discussed herein. Plate 110 may further comprise integrated circuitry, microelectromechanical systems (MEMS) components and/or any of a various other constituent structures (not shown), although certain embodiments are not limited in this regard.

Prior to or during stage 100*a*, plate 110 may be prepared for the application of an adhesive material. For example, some or all of a surface of plate 110, represented by the illustrative face 105, may be cleaned with a solvent, detergent or other such chemical and/or treated with an adhesion promoter. The portion of plate 100 which forms face 105 may be curved (e.g. where face 105 is not planar), flat, flexible, or rigid, according to different embodiments. Face 105 may have an area of approximately 400 $cm^2$ to 900 $cm^2$, although certain embodiments are not limited in this regard. In one embodiment, processing to prepare face 105 for application of an adhesive material thereon may include operations adapted from known techniques, which are not described herein.

At stage 100*b*, a layer of adhesive material, represented by the illustrative adhesive layer 120, may be applied to some or all of face 105. Adhesive layer 120 may include benzocyclobuten (BCB), an epoxy-type photoresist such as SU-8 and/or any of a variety of other thermal curable photocurable and/or radiation curable adhesive materials. In an embodiment, application of adhesive layer 120 onto face 105 may be by spin-coating, slit coating, spray coating, screen-printing and/or any of various other application methods. Application of adhesive layer 120 may include operations adapted, for example, from conventional techniques for coating with adhesive materials. In an embodiment, adhesive layer 120 is a thin film—e.g. where adhesive layer 120 has a thickness, at least before curing, in the range of 1 micron to 30 microns. However, the thickness of adhesive layer 120 may vary in different embodiments according to implementation-specific details such as the particular adhesive used and/or the area of face 105.

After stage 100*b*, additional processing may take place for one or more portions of adhesive layer 120—e.g. less than all of adhesive layer 120—to be selectively cured at least in part before another plate is to be laminated with plate 110 via adhesive layer 120. For example, a side of adhesive layer 120 which faces away from plate 110 may be selectively exposed in part to one or more sources of light for inducing the at least partial cure.

Stage 100*c* illustrates one example of such a partial cure according to one embodiment. At stage 100*c*, one or more regions of adhesive layer 120—e.g. but not one or more other regions of adhesive layer 120—may be selectively exposed to light 140 from one or more light sources (not shown). Light 140 may include a wavelength suitable for inducing some curing of the adhesive material of adhesive layer 120. For example, light 140 may include UV light, although certain embodiments are not limited in this regard.

In the embodiment illustrated in FIG. 1, the selective exposure of adhesive layer 120 to light 140 is achieved with a mask 130 which includes one or more slits, holes and/or other openings to allow only some of light 140 to pass through mask 130 and impinge on one or more portions of adhesive layer 120. In an embodiment, such selective exposure may be additionally or alternatively achieved by targeting one or more regions of adhesive layer 120 with laser light—e.g. without a need for mask 130. The selective curing of adhesive layer 120, such as that at stage 100*c*, may form in adhesive layer 120 at least a first portion adjoining a second portion of adhesive layer 120, wherein a level of cure of the first portion is greater than a level of cure of the second portion.

An example of such portions are illustrated in stage 100*d*, wherein one or more zones 125 of adhesive layer 120 represent at least part of a first portion having a relatively high level of cure and other adhesive material of adhesive layer 120 represents at least part of a second portion having a relatively low level of cure. For example, some or all of one or more zones 125 may each adjoin another respective portion of adhesive layer 120 which is uncured or otherwise has a level of cure less than that of the zone in question.

By way of illustration and not limitation, the partial curing at stage 100*c* may result in a portion or portions of adhesive layer 120 having a viscosity greater than that of one or more other portions of adhesive layer 120. A viscosity differential for different portions of adhesive layer 120 may be at or above some threshold amount. In an embodiment, a portion of adhesive layer 120 may have a relatively greater viscosity by at least a factor of ten (10). For example, one portion may be cured to a viscosity which is at or above 5000 centipoise, while another portion, being uncured or relatively less cured, concurrently has a viscosity which is at or below 500 centipoise. However, such viscosity levels may vary in different embodiments according to one or more implementation-specific details including, but not limited to the adhesive material used, the thickness of adhesive layer 120, the size, shape, number and position of one or more zones 125 and/or the like. In certain embodiments, a threshold viscosity differential is five (5) or larger.

The illustrated size, number, shape and arrangement of one or more zones 125 is merely illustrative, and may vary in different embodiments according to implementation-specific details. For example, in the illustrated stage 100*d*, one or more zones 125 are variously surrounded by relatively less cured adhesive material. In certain embodiments, adhesive layer 120 may additionally or alternatively include one or more relatively less cured portions of adhesive material which are each surrounded by a respective portion of relatively more cured adhesive material. In an embodiment, one or more zones 125 may be arranged in adhesive layer 120 to conform in one or more respects to a later cutting, stamping or other such processing to selectively remove portions of the resulting laminate—e.g. where such processing is to form a screen, lens or other optical device from the laminate.

In an embodiment, a characteristic of one or more zones 125—e.g. including some or all of the respective size, number, shape and level of cure of such zones, the relative arrangement of zones with respect to one another, etc.—may contribute to improved consistency in the thickness of adhesive layer 120 between laminated plates. By way of illustration and not limitation, some or all of one or more zones 125 may each have a respective level of cure which makes the zone at least partially inelastic or otherwise resistant to compression between two plates of the laminate.

Alternatively or in addition, the size, shape, number, arrangement and/or cure of one or more zones 125 may result in changes to fluid dynamic characteristics of adhesive layer 120. For example, one or more zones 125 may provide for an increased surface tension for the exposed side of adhesive layer 120. Such changes to adhesive layer 120 may allow for improved lamination of plate 110 with one or more other plates via adhesive layer 120. In an embodiment, one or more zones 125 may resist flow of a relatively less cured portion of adhesive layer 120 during application and/or pressure of another plate on the surface of adhesive layer 120. For example, one or more zones 125 may form one or more dots, lines, polygons etc. in the surface of adhesive layer 120—i.e. where some or all of one or more zones 125 are distributed randomly or in a lattice, matrix, or other pattern. As a result, one or more zones 125 allows for the adhesive layer 120 of a final resulting laminate to have a more consistent thickness—e.g. as compared to adhesive layers of laminates fabricated according to conventional techniques.

The at least partial curing of one or more zones 125 may provide for consistent thickness of adhesive layer 120 without significantly affecting the ability to adhere another plate to adhesive layer 120. In an embodiment, a total area of partially cured zones of adhesive layer 120 may be less than some threshold percentage of a total area of adhesive layer 120 which has been processed for partial curing. For example, a total area of one or more zones 125 at the surface of adhesive layer 120 may be at or below 1% of the total area of adhesive layer 120 which has completed partial cure processing.

Figure 2:
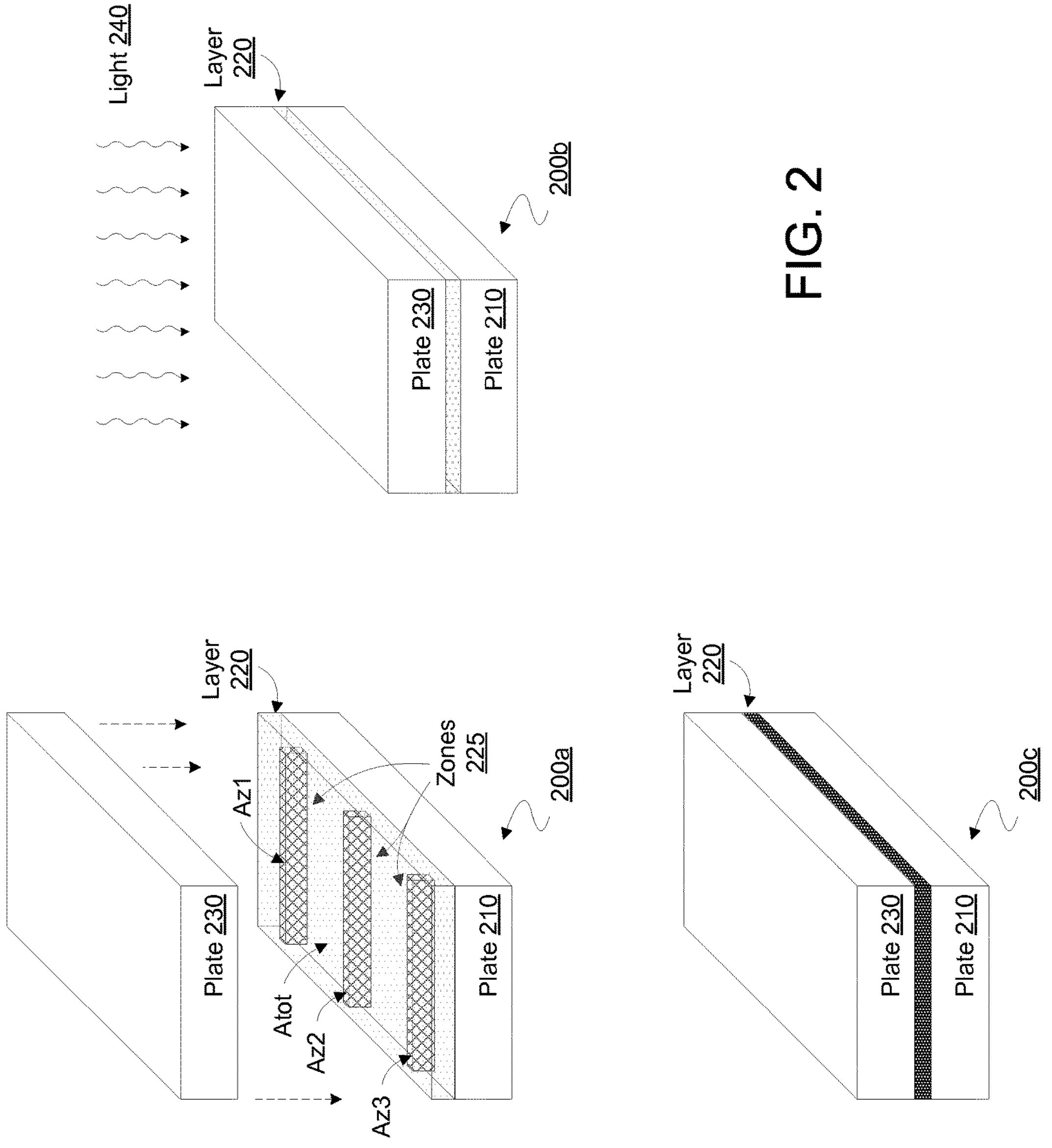
FIG. 2 is a block diagram illustrating elements of a process for fabricating a laminate structure according to an embodiment.

FIG. 2 illustrates elements of a fabrication process for generating a laminate according to an embodiment. The fabrication process illustrated in FIG. 2 may include some or all of the features of that illustrated in FIG. 1, for example.

FIG. 2 shows features of various stages 200*a*, 200*b*, 200*c* of a lamination process. At stage 200*a*, a first laminate structure including a plate 210 and an adhesive layer 220 disposed thereon is provided for adhesion with another plate 230. The first laminate structure provided at stage 200*a* may include some or all of the laminate structure of stage 100*d*, for example. By way of illustration and not limitation, adhesive layer 220 may include one or more zones 225 having some or all of the characteristics of zones 125. Plate 210 may include, for example, some or all of the features of a constituent layer which are discussed herein with respect to plate 110. The same is true for plate 230, although plates 210, 230 may include different respective materials, constituent layers, components and/or the like, in various embodiments.

The size, number, shape, cure and/or arrangement of one or more zones 225, which is merely illustrative and not limiting on certain embodiments, may provide for improved consistency in a final thickness of adhesive layer 220 between plates 210, 230. By way of illustration and not limitation, the side of adhesive layer 220 which faces away from plate 210 may have a total area Atot which has been processed for selective, or partial, curing. In an embodiment, an area of one or more zones 225 on that side—illustrated as including component areas Az1, Az2, Az3—is at or below some maximum threshold percentage of Atot. For example, a total cross-sectional area of one or more zones 225 may be at or below 5% of Atot.

Application of plate 230 onto adhesion layer 220 may form a second laminate structure for stage 200*b*. Pressure may be applied to the second laminate structure prior to or during stage 200*b*—e.g. to activate further curing of adhesive layer 220, to provide a desired thickness of adhesive layer 220 (or of the second laminate structure overall), to evenly distribute adhesive material of adhesive layer 220 and/or the like. By way of illustration and not limitation, the stacked plates 210, 230 of the second laminate structure may be vacuum sealed, cold rolled, hot rolled or otherwise compressed for even and/or complete lamination with one another via adhesive layer 220. During such compression, the one or more zones 225 may provide at least some resistance to facilitate consistency in the thickness of adhesive layer 220—e.g. where one or more zones 225 serve as spacers within adhesive layer 220 and/or limit a flow of a comparatively less cured portion of adhesive layer 220.

During or after the application of such pressure, the adhesive layer may be further cured—e.g. in response to the application of pressure, heat and/or light on the second laminate structure. By way of illustration and not limitation, one or both of plates 210, 230 may be at least partially transparent to a wavelength of light 240, which may be applied through one of both such plates 210, 230 to a photocurable material of adhesive layer 220. Such further curing may result in a third laminate structure of stage 200*c*, wherein portions of adhesive layer 220 which previously had different respective levels of cure have substantially the same level of cure. In the third laminate structure of stage 200*c*, or in a final apparatus generated from such a laminate structure, different portions of the finally cured adhesive layer 220 may have different residual bond structures or other cure characteristics which are indicative of the location (s) of one or more zones 225.

Figure 3:
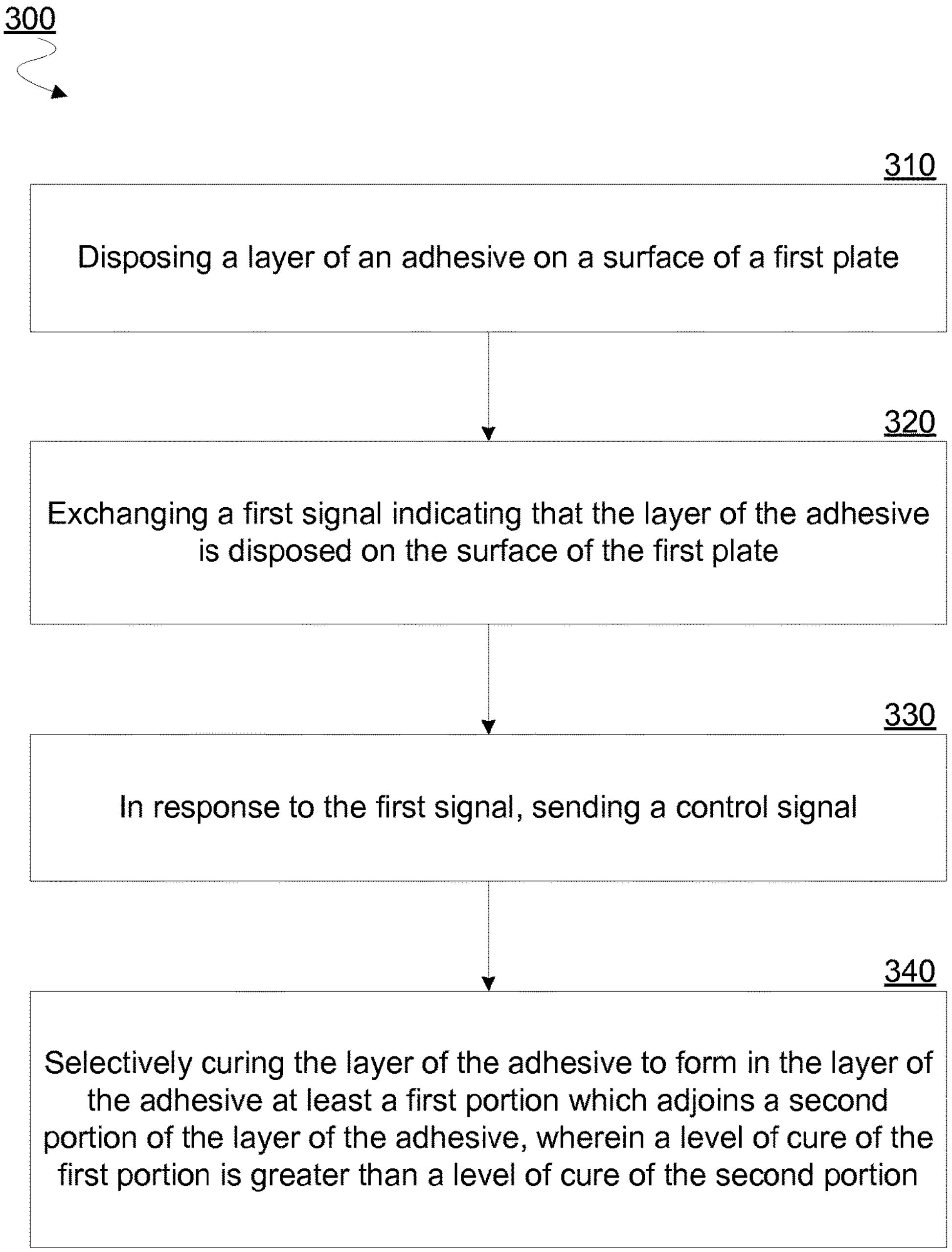
FIG. 3 is a flow diagram illustrating elements of a lamination method according to an embodiment.

FIG. 3 illustrates elements of a method 300 for assembling a laminate structure according to an embodiment. Method 300 may be performed to generate the laminate structure of stage 100*d* and/or of stage 200*a*, for example.

Method 300 may include, at 310, disposing a layer of an adhesive on a surface of a first plate. The disposing at 310 may include, for example, spin coating and/or spray coating one or more adhesive materials on a flat surface of the first plate. In an embodiment, such one or more adhesive materials may include a heat-curable or photo-curable adhesive such as SU-8, BCB, Dymax OP29 and/or the like.

Method 300 may further include, at 320, exchanging a first signal indicating that the layer of the adhesive is disposed on the surface of the first plate. For example, the signal exchanged at 320 may be received by control logic from a system or sub-system which is to perform the disposing at 310. In response to the exchanged first signal, method 300 may include, at 330, sending a second signal which, for example, is to control a partial curing of the layer of adhesive. For example, the control logic may send the second signal to another system or sub-system, referred to herein as a cure sub-system, which is to selectively expose less than all of the layer of adhesive to light.

Based on second signal, method 300 may, at 340, selectively cure the layer of the adhesive. The selective curing at 340 may form in the layer of the adhesive at least a first portion which adjoins a second portion of the layer of the adhesive, wherein a level of cure of the first portion is greater than a level of cure of the second portion. In an embodiment, the selective curing at 340 includes directing light through a mask and onto at least the first portion of the layer of the adhesive. Alternatively or in addition, the selective curing at 340 may include directing laser light onto at least the first portion of the layer of the adhesive. A level of exposure of the first portion to light for the selective curing may be different than a corresponding level of exposure of the second portion to light—e.g. where the second portion is exposed to less than or no such light during the partial cure processing.

In an embodiment, method 300 may include one or more additional operations (not shown) to form a laminate with the laminate structure formed with operations 310 to 340. By way of illustration and not limitation, after the selective curing at 340, method 300 may further comprise adhering a second plate onto the layer of the adhesive, including adhering the second plate onto the second portion of the layer. After such adhering of the second plate onto the layer of the adhesive, method 300 may further comprise curing the second portion of the layer, at least partially. For example such further curing may bring the layer of adhesive to a state of substantially complete curing.

Figure 4:
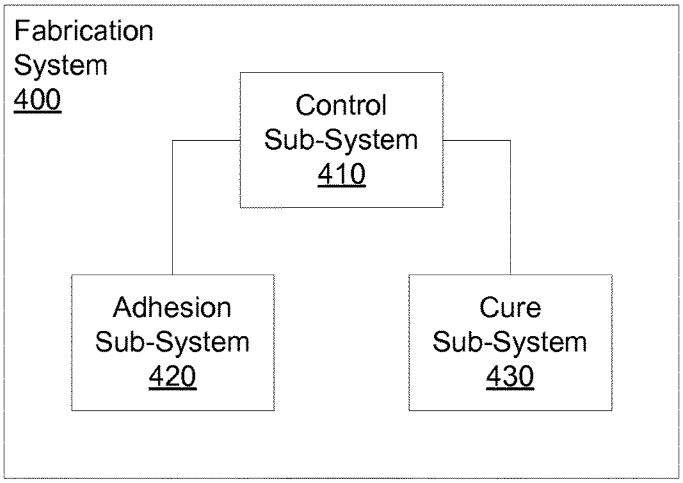
FIG. 4 is a block diagram illustrating elements of a system for fabricating a laminate structure according to an embodiment.

FIG. 4 illustrates elements of a fabrication system 400 for generating at least part of a laminate according to an embodiment. Fabrication system 400 may include logic to control operations of method 300, for example. Alternatively or in addition, fabrication system 400 may include hardware which is to perform operations of method 300 under control of such logic. Certain embodiments may be implemented entirely within one or more sub-systems of fabrication system 400—e.g. within control logic of fabrication system 400 and/or within hardware of fabrication system 400 which is to implement an at least partial curing of an adhesive layer.

In an embodiment, fabrication system 400 includes an adhesion sub-system 420 to dispose a layer of adhesive material on at least part of a surface of a plate. For example, adhesion sub-system 420 may include or couple to hardware to perform spin coating, spray coating, screen printing and/or any of a variety of additional or alternative operations for disposing an adhesive material. Alternatively or in addition, adhesion sub-system 420 may include detection logic to identify that such hardware has completed a disposal of an adhesive layer. Adhesion sub-system 420 may comprise one or more known mechanisms, which are not described herein, for such disposing of an adhesive material. In some embodiments, adhesion sub-system 420 is external to, and coupled to, fabrication system 400.

Fabrication system 400 may further comprise a control sub-system 410 coupled to adhesion sub-system 420. Control sub-system 410 may include hardware, firmware and/or executing software to perform operations, such as those in method 300, to control preparation of an adhesive layer for lamination of constituent layers with one another. By way of illustration and not limitation, control sub-system 410 may include one or more of a state machine, controller, application-specific integrated circuit (ASIC), field programmable gate array (FPGA), and/or other circuit logic to detect a signal—e.g. from adhesion sub-system 420—indicating that an adhesive layer has been disposed on a plate. In response to such a signal, control sub-system 410 may send one or more control signals to begin a partial curing of the adhesive layer—e.g. where such curing is in preparation for a second plate to be applied to the adhesive layer. Control sub-system 410 may include one or more computer-readable storage media storing instructions to control processes for fabricating a laminate structure—e.g. where control sub-system 410 includes a computer or network of computers for such process control.

In an embodiment, fabrication system 400 includes a cure sub-system 430 coupled to control sub-system 410. Cure sub-system 430 may include circuitry or other means to receive one or more control signals, e.g. from control sub-system 410, and in response, to perform an at least partial cure of an adhesive layer. For example, cure sub-system 430 may include or couple to one or more means for exposing only first one or more portions of the adhesive layer—e.g. but not second one or more portions of the adhesive layer—to light for selectively inducing an at least partial cure of the first one or more portions. By way of illustration and not limitation, cure sub-system 430 may include or couple to one or more light sources including, but not limited to, a visible light lamp, a UV lamp, a laser and/or the like. In an embodiment, cure-subsystem 430 includes logic for directing one or more lasers to variously target a portion or portions of the adhesive layer. Alternatively or in addition, cure sub-system 430 may include or couple to one or more masks to selectively block some light from the one or more light sources—e.g. while concurrently allowing other light to from the one or more light sources to be incident upon the adhesive layer. In an embodiment, generation and/or use of such a mask may include one or more operations adapted from conventional photoresist techniques, for example.

Figure 5:
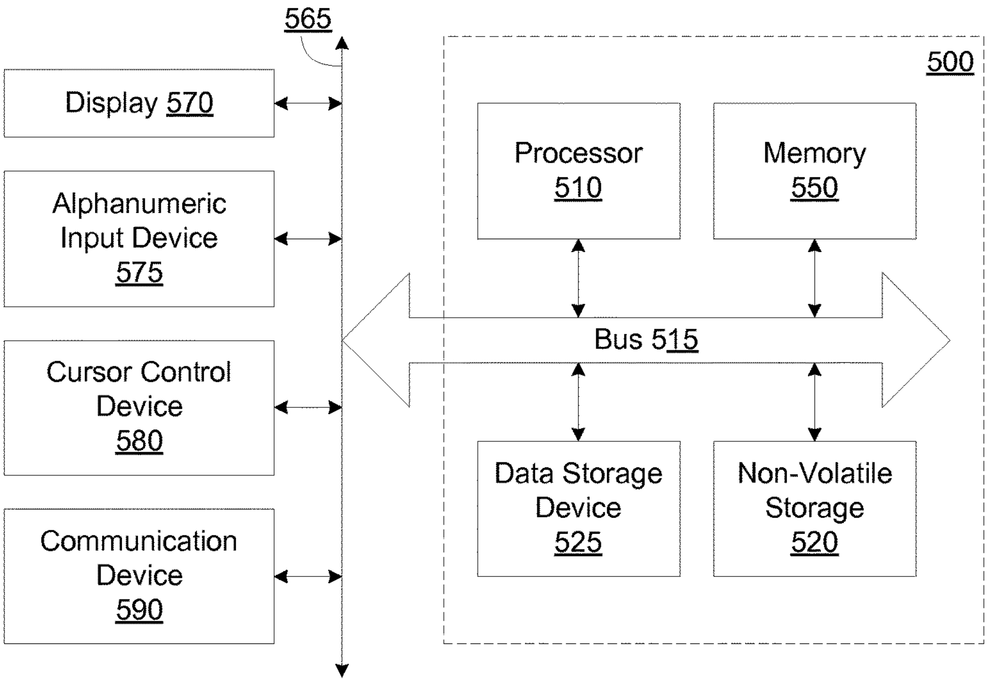
FIG. 5 is a block diagram illustrating elements of a computer platform for controlling a process to fabricate a laminate structure according to an embodiment.

FIG. 5 illustrates elements of a computer platform 500 according to an embodiment for controlling processes to fabricate a laminate structure. Computer platform 500 as illustrated includes bus or other internal communication means 515 for communicating information, and processor 510 coupled to bus 515 for processing information. The platform further comprises random access memory (RAM) or other volatile storage device, illustrated as memory 550 (alternatively referred to herein as main memory), coupled to bus 515 for storing information and instructions to be executed by processor 510. Main memory 550 also may be used for storing temporary variables or other intermediate information during execution of instructions by processor 510. Computer platform 500 also comprises read only memory (ROM) and/or non-volatile storage device 520 coupled to bus 515 for storing static information and instructions for processor 510, and data storage device 525 such as a magnetic disk or optical disk and its corresponding disk drive. Data storage device 525 may be coupled to bus 515 for storing information and instructions.

Computer platform 500 may further be coupled to display device 570, such as a cathode ray tube (CRT) or a liquid crystal display (LCD) coupled to bus 515 through bus 565 for displaying information to a computer user. Alphanumeric input device 575, including alphanumeric and other keys, may also be coupled to bus 515 through bus 565 for communicating information and command selections to processor 510. An additional user input device is cursor control device 580, such as a mouse, a trackball, stylus, or cursor direction keys coupled to bus 515 through bus 565 for communicating direction information and command selections to processor 510, and for controlling cursor movement on display device 570. In embodiments utilizing a touch-screen interface, it is understood that display 570, input device 575 and cursor control device 580 may all be integrated into a touch-screen unit.

Another device, which may optionally be coupled to computer platform 500, is a communication device 590 for accessing other nodes of a distributed system via a network. Communication device 590 may include any of a number of commercially available networking peripheral devices such as those used for coupling to an Ethernet, token ring, Internet, or wide area network. Communication device 590 may further be a null-modem connection, or any other mechanism that provides connectivity between computer platform 500 and the outside world. Note that any or all of the components of this system illustrated in FIG. 5 and associated hardware may be used in various embodiments of the disclosure.

It will be appreciated by those of ordinary skill in the art that any configuration of the system illustrated in FIG. 5 may be used for various purposes according to the particular implementation. The control logic or software implementing embodiments of the disclosure can be stored in main memory 550, mass storage device 525, or other storage medium locally or remotely accessible to processor 510.

It will be apparent to those of ordinary skill in the art that any system, method, and process to fabricate a laminate structure as described herein can be implemented as software stored in main memory 550 or read only memory 520 and executed by processor 510. This control logic or software may also be resident on an article of manufacture comprising a computer readable storage medium having computer readable program code stored therein and being readable the mass storage device 525 and for causing processor 510 to operate in accordance with the methods and teachings herein.

Techniques and architectures for fabricating a laminate structure are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method for adhering a first plate to a second plate, the method comprising:

disposing a layer of an adhesive on a surface of the first plate;

selectively curing the layer of the adhesive to form in the layer of the adhesive first portions, wherein the first portions are separated from each other by a second portion of the layer of the adhesive, wherein the first portions are collectively less than all of the layer of the adhesive, and wherein a level of cure of the first portions is greater than a level of cure of the second portion; and after selectively curing the layer of the adhesive, adhering the second plate onto the layer of the adhesive, including:

bringing the second plate into contact with the first portions and the second portion while the level of cure of the first portion is greater than the level of cure of the second portion; and applying a pressure to the first portions and the second portion while the second plate is in contact with the first portions and the second portion, and wherein the first portions limit the pressure applied to the second portion to provide a consistent thickness of the layer of the adhesive.

2. The method of claim 1, wherein selectively curing the layer of the adhesive comprises directing light through a mask and onto at least the first portions.

3. The method of claim 1, wherein selectively curing the layer of the adhesive comprises directing laser light onto at least the first portions without a mask.

4. The method of claim 1, wherein the second portion surrounds the first portions.

5. The method of claim 1, further comprising:

after adhering the second plate onto the layer of the adhesive, curing the second portion at least partially.

6. A method for controlling an adhering of a first plate to a second plate, the method comprising:

receiving a first signal indicating that a layer of an adhesive is disposed on a surface of the first plate;

in response to the first signal, sending a second signal to selectively cure the layer of the adhesive to form in the layer of the adhesive first portions, wherein the first portions are separated from each other by a second portion of the layer of the adhesive, wherein the first portions are collectively less than all of the layer of the adhesive, and wherein a level of cure of the first portions is greater than a level of cure of the second portion; and after sending the second signal to selectively cure the layer of the adhesive, sending a third signal to adhere the second plate onto the layer of the adhesive, wherein in response to the third signal, the second plate is brought into contact with the first portions and the second portion while the level of cure of the first portion is greater than the level of cure of the second portion; and applying a pressure to the first portions and the second portion while the second plate is in contact with the first portions and the second portion, and wherein the first portions limit the pressure applied to the second portion to provide a consistent thickness of the layer of the adhesive during the applying pressure.

7. The method of claim 6, wherein selectively curing the layer of the adhesive comprises directing light through a mask and onto at least the first portions.

8. The method of claim 6, wherein selectively curing the layer of the adhesive comprises directing laser light onto at least the first portions without a mask.

9. The method of claim 6, wherein the second portion surrounds the first portions.

10. The method of claim 1, wherein the surface of the first plate is formed by a material that is at least partially transparent to visible light, wherein the second plate is at least partially transparent to visible light.

11. The method of claim 1, wherein a relative arrangement of each of the first portions facilitates the consistent thickness of the layer of the adhesive when applying the pressure.

12. The method of claim 1, wherein a combined area of each of the first portions is less than or equal to five percent of a total area of the layer of the adhesive.

13. The method of claim 12, wherein the combined area of each of the first portions is less than or equal to one percent of the total area of the layer of the adhesive.

14. The method of claim 1, wherein each of the first portions has a first viscosity and the second portion has a second viscosity while the level of cure of the first portion is greater than the level of cure of the second portion, and wherein the first viscosity is greater than the second viscosity.

15. The method of claim 14, wherein the first viscosity is five times greater than the second viscosity.

16. The method of claim 1, further comprising:

activating further curing of the layer of the adhesive while applying the pressure, wherein after the further curing of the layer of the adhesive the level of cure of the first portions is equal to the level of cure of the second portion.

17. The method of claim 1, wherein the surface of the first plate is non-planar.

18. The method of claim 6, wherein a combined area of each of the first portions is less than or equal to five percent of a total area of the layer of the adhesive.

19. The method of claim 6, wherein each of the first portions has a first viscosity and the second portion has a second viscosity while the level of cure of the first portion is greater than the level of cure of the second portion, and wherein the first viscosity is five times greater than the second viscosity.

* * * * *